United States Patent Office 3,405,038
Patented Oct. 8, 1968

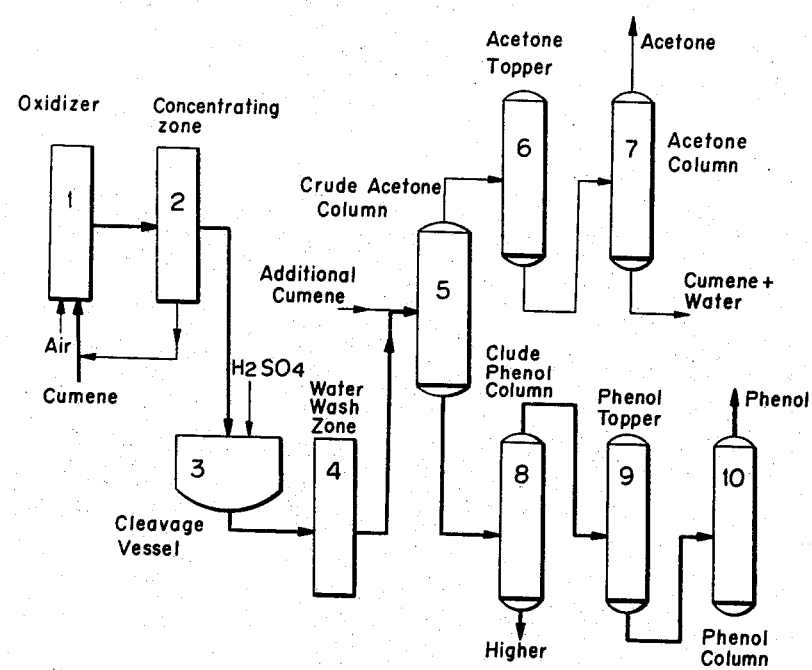

3,405,038
PROCESS FOR THE MANUFACTURE OF HIGHLY PURE PHENOL BY DISTILLATION IN THE PRESENCE OF EXCESS CUMENE
Masayuki Kohmoto, Ohtake-shi, Japan, assignor to Mitsui Petrochemical Industries, Ltd., Tokyo, Japan
Continuation-in-part of application Ser. No. 320,940, Nov. 1, 1963. This application Apr. 25, 1967, Ser. No. 633,605
Claims priority, application Japan, Mar. 27, 1963, 38/13,881
2 Claims. (Cl. 203—69)

ABSTRACT OF THE DISCLOSURE

Process for producing a purified phenol from a conventional oxidative-cumene process by adjusting the remaining cumene to phenol ratio so that it is within a range of 0.28:1 to 1:1 prior to a first distillation step to remove those products boiling at a lower boiling point than phenol thereafter subjecting the residue to a second distillation step to remove the phenol in the overhead fraction.

This application is a continuation-in-part of copending application Ser. No. 320,940, filed on Nov. 1, 1963, now abandoned.

The present invention relates to a process for the production of highly pure phenol by so-called cumene process, more particularly to a process for the production of highly pure phenol from a crude phenol which is obtained by the oxidation of cumene followed by the cleavage of cumene hydroperoxide thus formed.

BACKGROUND OF THE INVENTION

There have already been proposed various processes on industrial scale for the production of phenol by the oxidation of cumene, subsequent cleavage of cumene hydroperoxide and distillation of the cleavage reaction product. In the oxidation step, it is usual to maintain the degree of oxidation of cumene to cumene hydroperoxide to about 20 to 25% of the theoretical value to prevent the reaction system from the decomposition of cumene hydroperoxide and from the risk of explosion (cf. British Patent No. 649,286). The oxidation reaction product is usually subjected to a distillation, before it is subjected to the subsequent cleavage reaction to remove most of the unreacted cumene therefrom, thus it is possible to reduce the dimensions of apparatus for the cleavage reaction and subsequent distillation and to minimize the operating cost therefor (cf. U.S. Patent No. 2,986,583). After the cleavage reaction of cumene hydroperoxide in the presence of an acid catalyst, the cleavage reaction product is washed with water to remove the acid catalyst and then sent to a purification step.

The cleavage reaction product is mainly composed of phenol, acetone, water and cumene and further contains various impurities, typically acetophenone, phenyl dimethyl carbinol, acetaldehyde, p-cumylphenol, α-methylstyrene, mesityl oxide, hydroxyacetone, acetoin, 2-methyl benzofuran, 2,3-dimethyl benzofuran and the like. Among these impurities, α-hydroxycarbonyl compounds represented by the general formula:

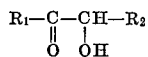

where $R_1$ and $R_2$ each represent hydrogen or alkyl group, typically hydroxyacetone and acetoin and benzofuran derivatives which are condensation products of α-hydroxycarbonyl compounds with phenol, typically 2-methyl benzofuran and 2,3-dimethyl benzofuran are generally considered to be a factor to cause an undesirable color formation when the phenol containing such impurities is subjected to chlorination or sulfonation. If phenol is used as starting material for synthetic fibre manufacture, therefore, it is required for the phenol to have such a high purity as substantially free from these impurities.

In order to isolate a desired product or products from the cleavage reaction product, it is conventional to take a method wherein acetone, water and low-boiling impurities are first distilled off as overhead fraction leaving phenol, unreacted cumene and high-boiling impurities as bottom residue which is then distilled to isolate the phenol or a method wherein acetone, water, unreacted cumene and low-boiling impurities are first distilled off as overhead fraction, leaving phenol and high-boiling impurities as bottom residue which is then distilled to isolate the phenol.

As examples of the former method, there may be mentioned U.S. Patent No. 2,824,048 to Hupe et al. and U.S. Patent No. 2,862,855 to Lang et al. both of which relate to such improvement that after the removal of acetone, the bottom residue is further distilled with the addition of large amount of water thereby to remove effectively cumene and methylstyrene from phenol. However, by such a method, it is impossible to remove trace impurities such as hydroxy acetone and 2,3-dimethyl benzofuran from phenol.

An example of the latter method is described in U.S. Patent No. 3,169,101 to Berthoux which relates to a process wherein after the removal of acetone and cumene by a conventional simple distillation, the bottom residue containing impure phenol is distilled with the addition of a solvent boiling higher than phenol such as diethylene glycol and diethylene glycol monobutyl ether to facilitate the effective removal of impurities from phenol. This method may achieve the effective removal of remaining cumene, α-methylstyrene, mesityl oxide, 2-methyl benzofuran and hydroxyacetone, but necessitates a large-sized plant due to the use of an additional solvent having a higher boiling point than that of phenol in a larger amount than that of phenol present and also necessitates an additional step for the recovery of said solvent. Therefore, even if a highly pure phenol is obtained by this method, the production cost hereof is fairly high.

SUMMARY OF THE INVENTION

The object of the present invention is to provide an improvement in the process for the production of phenol by distillation of a crude phenol obtained by the oxidation of cumene followed by the cleavage of cumene hydroperoxide; the principle upon which the present invention is based is substantially different from that of such a known extractive distillation with the addition of a particular solvent as used in the above-mentioned process. That is, the present invention intends to remove troublesome color-forming impurities together with the removal of acetone and cumene in a single distillation step under a controlled condition, leaving phenol containing high boiling impurities which can be easily removed from phenol by a subsequent simple distillation and thus the production of phenol having exceptionally high purity free from troublesome impurities, particularly from α-hydroxycarbonyl compounds can be achieved very easily and economically.

According to the present invention, in a process for the production of phenol by the oxidation of cumene, subsequent cleavage of cumene hydroperoxide and distillation of the cleavage reaction product, there is provided an improvement which comprises subjecting the cleavage reaction product which consists of phenol, acetone, cumene, water and other impurities including α-hydroxycarbonyl compounds the presence of which causes undesirable color formation on chlorination and sulfonation of the phenol to a distillation, with no previous distillation step for removal of acetone, in such a manner that the content of cumene in the feed for the distillation is maintained to a value at least 0.28 part by weight of cumene per part by weight of phenol contained therein and that the temperature at a point in the distillation column above the feeding point of the feed is maintained at a value from 110° C. to the boiling point of cumene at atmospheric pressure in order to distill off completely acetone, cumene, water, α-hydroxycarbonyl compounds and other low boilers as overhead fraction which is practically free from phenol and then subjecting the residual mixture consisting substantially of phenol and high boilers to a distillation to isolate a highly pure phenol from the high boilers.

BRIEF DESCRIPTION OF THE DRAWING

The single figure of the drawing is a simplified schematic diagram of the process according to the present invention.

DESCRIPTION OF THE PREFERRED EMBODIMENTS

In a preferred embodiment for carrying out the process of the present invention, the cleavage reaction product which usually contains 25–50% by weight of phenol and 20–50% by weight of acetone is, after the content of cumene therein is adjusted to at least 0.28 part by weight per part of phenol, introduced into a distillation column in which the temperature at a point upper than the feeding point of the feed by at least five plates is maintained at a value ranging from 130° C. to the boiling point of cumene at atmospheric pressure. Thus, according to the present invention, it is possible to remove directly from the cleavage reaction product not only acetone, cumene and water, but also troublesome color-forming impurities, typically α-hydroxycarbonyl compounds as overhead fraction, leaving phenol practically completely free from such color-forming impurities as bottom fraction.

As the feed to the distillation according to the present invention, it is preferred to use a crude phenol which was obtained by the oxidation of cumene, concentration of cumene hydroperoxide thus formed to the concentration of 70–80%, cleavage of cumene hydroperoxide in the presence of an acid catalyst, removal of the catalyst and washing the cleavage reaction product with water. Such a crude phenol will contain all the cleavage reaction products, that is acetone, phenol, water and various impurities including α-hydroxy carbonyl compounds and unreacted cumene. One of the characteristic features of the present invention is to use as the feed to the distillation such a crude phenol, that is the cleavage reaction product from which no acetone has been removed; this is based on my discovery that the presence of acetone in the feed is advantageous to obtain a very highly pure phenol. The use of a crude phenol containing 20 to 50% by weight of acetone is most preferred. Another characteristic feature of the present invention is that the presence of cumene in an amount at least 0.28 part by weight per part by weight of phenol contained in the feed is essential to maintain the temperature at a point in the distillation column above the feeding point of the feed at a value from 110° C. to the boiling point of cumene at atmospheric pressure. If the content of cumene is less than 0.28 part by weight per part by weight of phenol, it is difficult to maintain the temperature at that point at the specified value thereby to make a steady distilling operation impossible and to make the removal of color-forming impurities insufficient. The upper limit of the content of cumene is not particularly critical, but it is preferred from the economical point of view for the capacity of apparatus to use the content of cumene not greater than the content of phenol. When the feed, crude phenol, contains cumene in an amount less than 0.28 part by weight per part by weight of phenol, additional cumene is to be supplied to the feed through the supply pipe of the feed or to the column through an inlet point positioned near the feeding point of the feed to maintain the content of cumene at a value at least 0.28 part by weight per part by weight of phenol as the whole contained in the distillation column.

The distillation according to the present invention may be carried out at atmospheric pressure or a reduced pressure.

The process of the present invention is further illustrated by referring to the accompanying drawing in which a typical embodiment of the present invention is shown.

Air and cumene each are introduced into oxidation reactor 1. Cumene hydroperoxide formed in the reactor 1 is introduced into concentrating zone 2, from which unreacted cumene is recycled to the reactor 1. A fluid containing a major proportion of cumene hydroperoxide is then sent to cleavage reaction vessel 3 in which the cumene hydroperoxide is cleaved into acetone and phenol. Liquid effluent from the cleavage vessel 3 is neutralized and washed with water in water wash zone 4. Liquid effluent from the water wash zone 4 is fed into distillation column 5 referred to as crude acetone column in which it is separated into an overhead fraction containing acetone, cumene, water and low boiling impurities including α-hydroxycarbonyl compounds and a bottom fraction containing phenol and high boiling impurities. The overhead fraction is introduced into acetone topper 6 in which low boiling impurities are removed and then sent to acetone column 7 in which pure acetone is isolated as overhead fraction, leaving cumene and water as bottom fraction. The bottom fraction from the crude acetone column 5 is passed through crude phenol column 8 in which higher boiling impurities are removed and then sent to phenol topper 9 in which remaining low boiling impurities are removed as overhead fraction. Bottom fraction from the phenol topper 9 is finally introduced into phenol column 10 in which pure phenol is isolated as overhead fraction from remaining high boiling impurities.

The present invention is illustrated, but not limited, by the following examples.

Example I

Cumene hydroperoxide mixture obtained by oxidation of cumene was cleaved in the presence of an acid catalyst and then the catalyst was removed by washing and neutralizing in a conventional manner. In order to separate the resulting product into an overhead fraction containing acetone, water, cumene and high boiling impurities and a bottom fraction containing phenol and higher boiling impurities, a continuous distillation column of 45 trays operated at atmospheric pressure was used. The feed, which contained 40% acetone, 36% phenol, 8% cumene, 11% water, 5% others (each wt. percent, the ratio of phenol to cumene=1.0.22) and 1380 p.p.m. hydroxyacetone, was introduced into the 15th tray from the bottom at a rate of 7,000 l./hr., maintaining the bottom temperature at 191° C. and the top temperature at 82° C.

Cumene was added to the feed at a rate of 250–350 l./hr., at the same time adjusting the temperature at the 17th through 35th trays from the bottom of column at a value between 130° C. and 135° C. (the ratio of phenol to cumene=1:0.33–0.36). The temperature of 40th tray was maintained at 100° C., and the bottom product contained as little as 60 p.p.m. hydroxyacetone.

By contrast, when no additional cumene was added to the feed, although the top and bottom temperature remained unchanged, the temperature of the trays mentioned above could not be maintained at 130° C.–135° C. and dropped to about 90° C., increasing the hydroxyacetone content of the bottom product to as much as 900 p.p.m.

Example II

To the same continuous distillation column of 45 trays and at atmospheric pressure as described in Example I, the feed, which contained 38% acetone, 35% phenol, 9.5% cumene, 12% water, 5.5% others (each wt. percent, the ratio of phenol to cumene=1:0.27) and 1500 p.p.m. hydroxyacetone, was introduced into the 25th tray from the bottom at a rate of 7000 l./hr., maintaining the bottom temperature at 191° C. and the top temperature at 79° C. Cumene was added to the feed at a rate of 100–200 l./hr., (the ratio of phenol to cumene=1:0.31–0.35), maintaining the temperature of the 27th through 35th trays from the bottom at 130° C.–135° C., and the bottom product contained only 30 p.p.m. hydroxyacetone.

However, when no additional cumene was added, the temperature of the 27th through 40th trays dropped to 88° C.–90° C. as against 80° C. at the top and 191° C. at the bottom, and the hydroxyacetone content of the bottom product increased as much as to 970 p.p.m.

Example III

To the same continuous distillation column of 45 trays and at atmospheric pressure as described in Example I, the feed, which contained 34% acetone, 30% phenol, 19% cumene, 11% water, 6% others (each wt. percent, the ratio of the phenol to cumene=1:0.63) and 1300 p.p.m. hydroxyacetone, was introduced into the 20th tray from the bottom at a rate of 6500 l./hr. In this case, the temperature of the 22nd through 35th trays from the bottom could be maintained at a value between 130° C. and 140° C. without adding cumene to the feed, and the bottom product contained only 65 p.p.m. hydroxyacetone.

Example IV

To the same continuous distillation column of 45 trays and at atmospheric pressure as described in Example I, the feed, which contained 27% acetone, 46% phenol, 12% cumene, 9% water, 6% others (each wt. percent, the ratio of the phenol to cumene=1:0.26) and 1,500 p.p.m. hydroxyacetone, was introduced into the 20th tray from the bottom at a rate of 4900 l./hr., maintaining the bottom temperature at 190° C. and the top temperature at 81° C.

Cumene was added to the feed at a rate of 50–140 l./hr. (the ratio of the phenol to cumene=1:0.28–0.32), maintaining the temperature of the 22nd through 35th trays from the bottom at 140–153° C., and the bottom product contained 55 p.p.m. hydroxyacetone, and the temperature of the 40th tray at that time was 112° C. From this, it was ascertained that the temperature distribution as above is sufficienly effective even when the feed contained considerably higher proportion of phenol than acetone.

I claim:

1. The process for the removal from impure phenol produced by the cleavage of cumene hydroperoxide, of impurities, including trace impurities, the presence of which causes undesirable color formation on chlorination and sulfonation of the phenol, which comprises adjusting the impure phenol by the addition of cumene in a quantity to achieve a ratio of at least 0.28 part by weight cumene to one part by weight of phenol in the impure phenol, then subjecting the impure phenol to a first distillation step in a distillation column wherein the temperature in the column above the feed point is maintained from 110° C. up to the boiling point of cumene whereby the impurities having boiling points up to and including cumene are distilled, thereafter subjecting the thereby partially purified phenol to a second distillation step at a temperature just sufficient to distill the phenol from impurities having higher boiling points than said phenol.

2. The process of claim 1 wherein the cumene is added in a quantity to achieve a range of ratios of cumene to phenol of from 0.28:1 to 1:1.

References Cited

UNITED STATES PATENTS

| | | | |
|---|---|---|---|
| 2,824,048 | 2/1958 | Hupe et al. | 260—621 |
| 2,862,855 | 12/1958 | Lang et al. | 260—621 |
| 2,992,169 | 7/1961 | Gregory et al. | 260—621 |
| 3,169,101 | 2/1965 | Berthoux | 203—59 |

WILBUR L. BASCOMB, JR., *Primary Examiner.*